(12) United States Patent
Winslow

(10) Patent No.: US 7,083,419 B2
(45) Date of Patent: Aug. 1, 2006

(54) DOLL FOR DEMONSTRATING A MEDICAL PROCEDURE

(76) Inventor: Wendy L. Winslow, 479 Cartier St., Manchester, NH (US) 03102

( * ) Notice: Subject to any disclaimer, the term of this patent is extended or adjusted under 35 U.S.C. 154(b) by 1112 days.

(21) Appl. No.: 10/038,992

(22) Filed: Dec. 31, 2001

(65) Prior Publication Data

US 2006/0127868 A1 Jun. 15, 2006

(51) Int. Cl.
*G09B 23/28* (2006.01)

(52) U.S. Cl. ...................... 434/273; 434/267

(58) Field of Classification Search ............... 434/262, 434/267, 268, 270, 272, 273, 275; 446/295, 446/296
See application file for complete search history.

(56) References Cited

U.S. PATENT DOCUMENTS

| | | | | |
|---|---|---|---|---|
| 2,678,505 A | * | 5/1954 | Munson | 434/272 |
| 3,213,550 A | * | 10/1965 | Kittner | 434/273 |
| 4,288,222 A | * | 9/1981 | Kling | 434/272 |
| 4,439,162 A | * | 3/1984 | Blaine | 434/268 |
| 4,822,285 A | * | 4/1989 | Summerville | 434/272 |
| D310,856 S | * | 9/1990 | Pedersen | D21/649 |
| 5,096,424 A | * | 3/1992 | Carlberg | 434/262 |
| 5,356,295 A | * | 10/1994 | Grosz | 434/267 |
| 5,795,157 A | * | 8/1998 | Weber et al. | 434/269 |
| 6,004,136 A | * | 12/1999 | Ehrenpreis | 434/262 |
| 6,159,017 A | * | 12/2000 | Coomansingh | 434/267 |
| 6,669,483 B1 | * | 12/2003 | Leight et al. | 434/262 |
| 6,854,976 B1 | * | 2/2005 | Suhr | 434/273 |

\* cited by examiner

*Primary Examiner*—Kurt Fernstrom
(74) *Attorney, Agent, or Firm*—Hiscock & Barclay, LLP

(57) ABSTRACT

An anatomical rag-type doll is provided with a hollow abdomen accessible by means of hook-and-loop type material, such as VELCRO™. The doll also has a pair of stuffed, simulated breasts. One of the breasts, representing a diseased breast, is hollow and has a removable nipple attached to the breast with hook-and-loop type material. Stuffing in the hollow diseased breast is removable, representing the removal of diseased fat and tissue during a mastectomy. The hollow abdomen is stuffed with simulated abdominal muscle and fat, as well as other simulated human organs. The simulated abdominal muscle and fat can be repositioned in the doll, as well as placed in the diseased breast to demonstrate the pedicle tram and free tram flap medical procedures.

10 Claims, 5 Drawing Sheets

DOLL FOR DEMONSTRATING A MEDICAL PROCEDURE

CROSS REFERENCE TO RELATED APPLICATIONS

This application claims priority to a Provisional patent application Ser. No. 60/187,144 filed in the U.S.P.T.O. on Mar. 6, 2000 in the name of Wendy Lou Winslow for an invention titled the same as above.

TECHNICAL FIELD

The present invention relates to dolls for demonstrating a medical procedure and, in particular, to methods and apparatus for demonstrating a mastectomy to a patient.

BACKGROUND OF THE INVENTION

Before surgery, it is common for a patient to experience anxiety. In order to relieve this anxiety, it is known in the prior art to use dolls to explain the nature and the condition of the patient and the corrective surgery. Examples of these prior art dolls include U.S. Pat. No. 5,411,437 to Weber, U.S. Pat. No. 5,104,328 to Lounsbury, and U.S. Pat. No. 4,288,222 to Kling. While these prior art dolls may be suitable for the specific medical conditions that they address, they are not as suitable for the demonstration of a mastectomy, namely the pedicle tram and the free tram flap medical procedures. Also, the prior art dolls are typically constructed from plastic, or other synthetic materials that can appear cold and unfriendly to the patient.

SUMMARY OF THE INVENTION

An object of the present invention is, therefore, to provide a method and apparatus for demonstrating a mastectomy to a patient.

Another object of the invention is to provide such a method and apparatus designed specifically to demonstrate the pre-surgical anatomy, the medical procedures, and the post-operative anatomy involved in the mastectomy.

A further object of the present invention is to provide such a method and apparatus designed specifically to demonstrate the pedicle tram and the free tram flap medical procedures.

Still another object is to provide such a method and apparatus with a soft and friendly "rag doll" appearance to further comfort the patient.

Further objects of the invention will appear as the description proceeds.

To the accomplishment of the above and related objects, this invention may be embodied in the form illustrated in the accompanying drawings, attention being called to the fact that the drawings are illustrative only and that changes may be made in the specific construction illustrated and described within the scope of the appended claims.

DETAILED DESCRIPTION OF PREFERRED EMBODIMENTS

Figure 1:
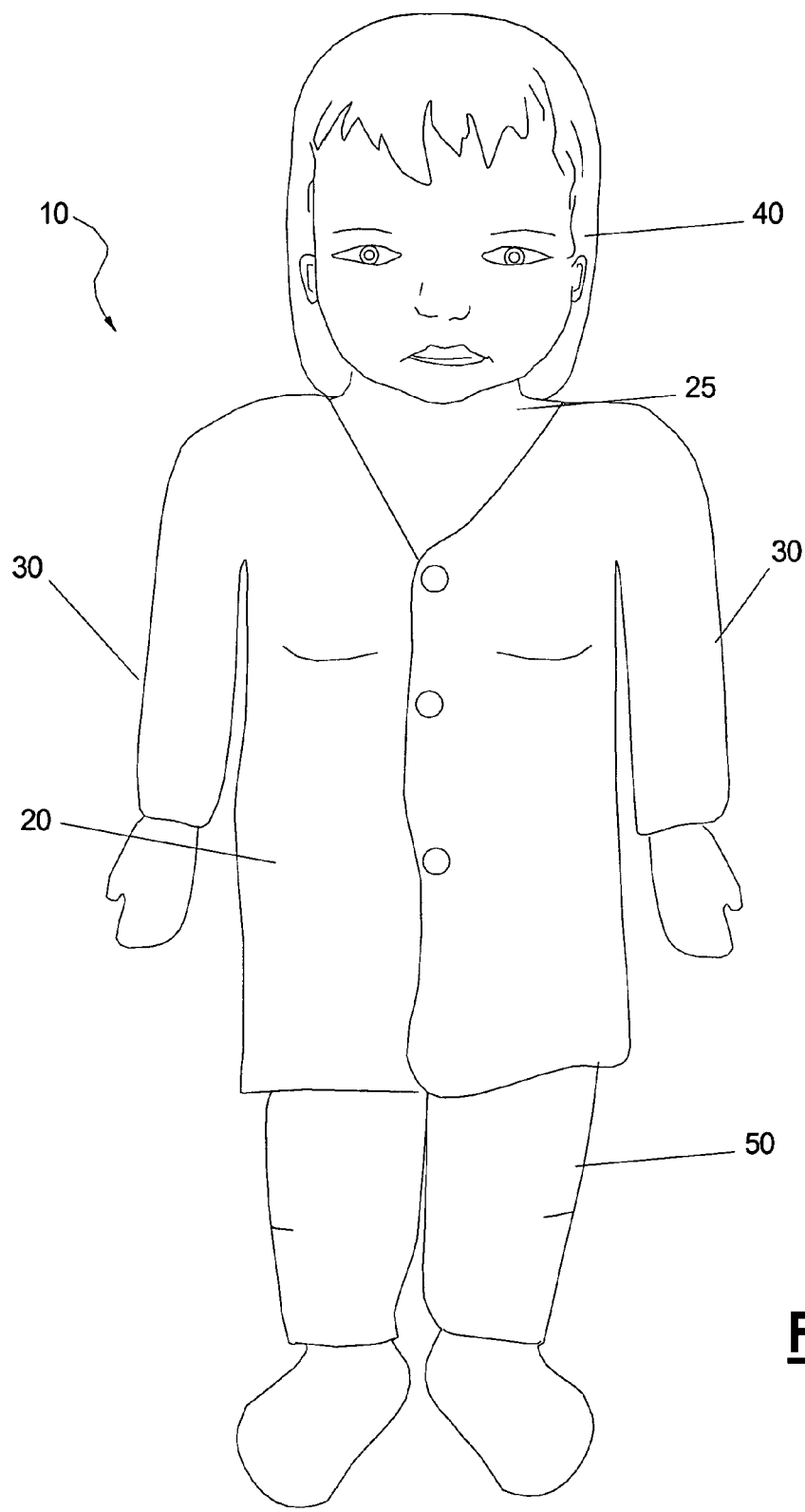
FIG. 1 is a frontal view of a doll in accordance with the present invention; the doll shown fully clothed.

FIG. 1 depicts a frontal view of the doll 10, dressed in clothing. This doll 10 is designed to demonstrate both the pedicle tram and the free tram flap medical procedures. The doll 10 can be used to demonstrate the pre-surgical anatomy, the medical procedures, and the post-operative anatomy involved in these two operations.

As shown in FIG. 1, the doll 10 consists of an abdomen 20, two arms 30, a head 40, and a pair of legs 50. The doll's abdomen 20 is generally constructed from two layers of cotton fabric that is sewn together around polyfill stuffing material. On the outside is the skin layer 25, which represents human skin, while the abdominal muscle layer 160 is on the inside. The arms 30, head 40, and legs 50 are generally constructed of a single layer of fabric. Various fabrics and stuffing materials that are well known in the art can be substituted for the polyfill and cotton.

Figure 2:
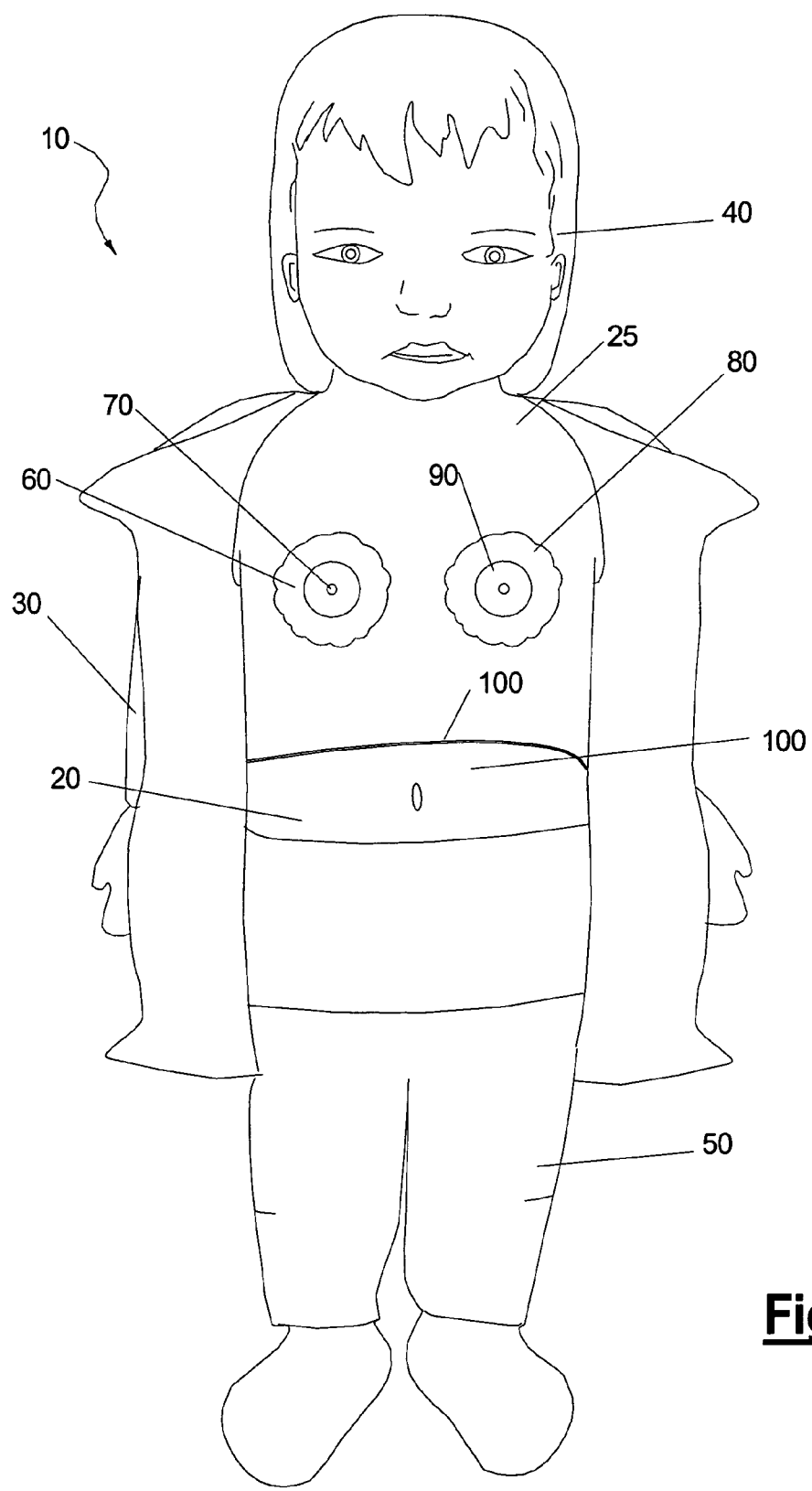
FIG. 2 is a frontal view of a doll in accordance with the present invention; the doll shown partially unclothed.

The doll 10 is shown partially undressed in FIG. 2, revealing a healthy breast 60 sewn onto the abdomen 20 and stuffed with polyfill. The healthy breast 60 has a nipple 70 sewn on its top. The doll 10 also has a diseased breast 80 sewn to the abdomen 20. The diseased breast 80 is filled with removable stuffing 85 (shown in FIG. 3) and has a detachable nipple piece 90 at its top. The detachable nipple piece 90 attaches to the diseased breast 80 using hook and loop type fastening material (VELCRO™), and covers a hole 55 therein (see FIG. 5). Other fastening materials, known in the art, such as snaps or tape can be substituted for VELCRO™ throughout the invention. An opening 75 in the underside of the diseased breast 80 protrudes through the doll's skin layer 25. The removable stuffing 85 (shown in FIG. 3) consists of polyfill material with colored pieces of string or cord tangled therein. The removable stuffing 85 represents human fat that is removed from the breast, containing human ducts, veins, arteries, lymph nodes, and milk ducts.

Also shown in FIG. 2 is removable abdominal skin 100, which covers an opening 110 (shown in FIG. 3) in the abdomen 20. The removable abdominal skin 100 attaches to the opening 110 with hook and loop type fastening material (VELCRO™), however other types of conventional fasteners could be substituted. The removable abdominal skin 100 has a removable bellybutton piece 120 attached to its center using VELCRO™. The belly button piece 120 is permanently attached to the inside of the abdomen 20 with a piece of fabric 125 (FIG. 4) which represents the human umbilicus. Located above the removable belly button piece 120 is skin flap 130. Skin flap 130 is removably attached to the abdomen 20 using VELCRO™ and covers the belly button transplant hole 150 (shown in FIG. 4), which is located in the abdomen 20. Finally, three pieces of plastic tubing 140 protrude through the doll's abdomen 20 and represent Jackson-Pratt™ tubing which is implanted in the patient for drainage.

Figure 3:
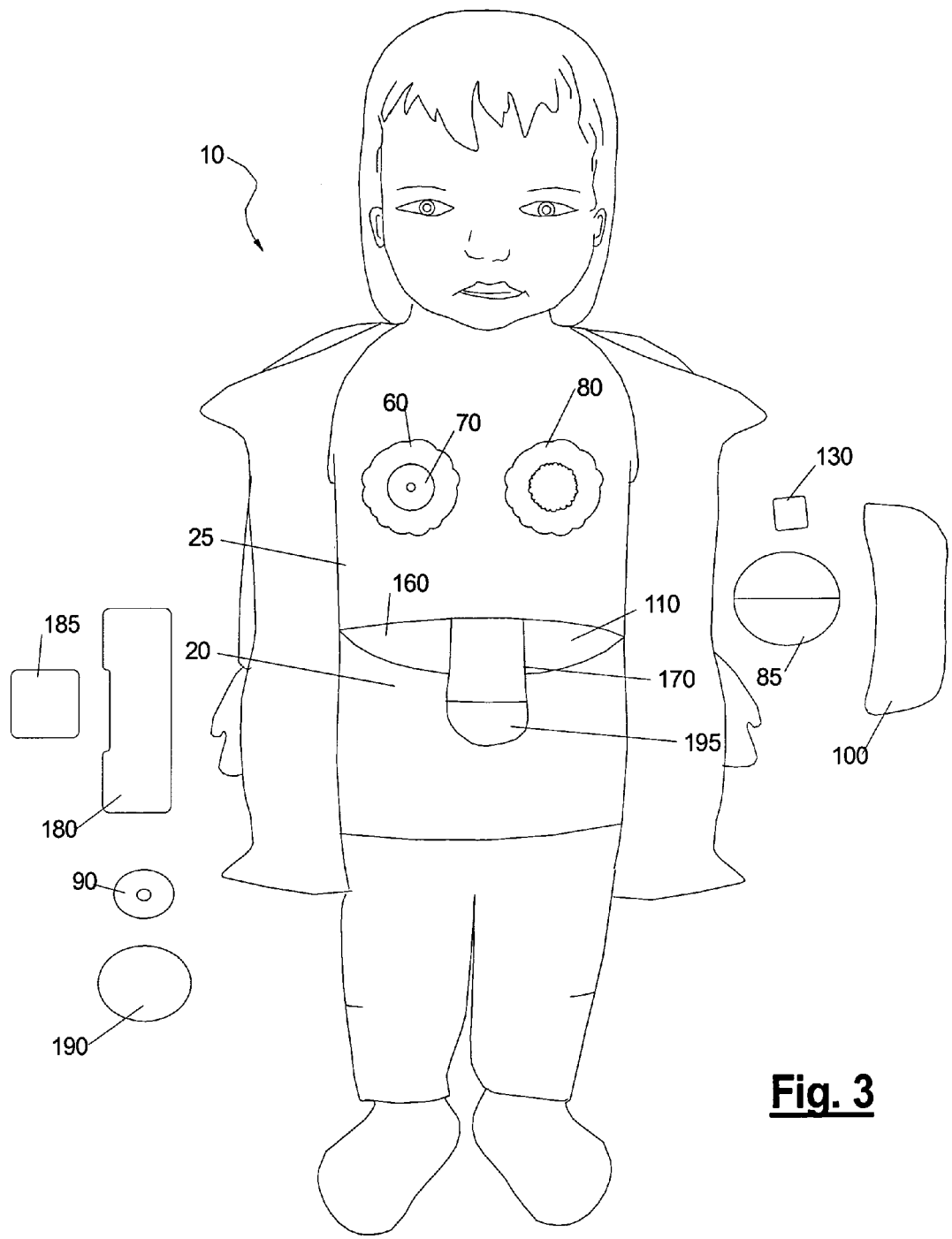
FIG. 3 is a frontal view of a doll in accordance with the present invention; the doll shown partially unclothed and with an incision in its abdomen; a piece of abdominal muscle is shown protruding through the incision.
Figure 4:
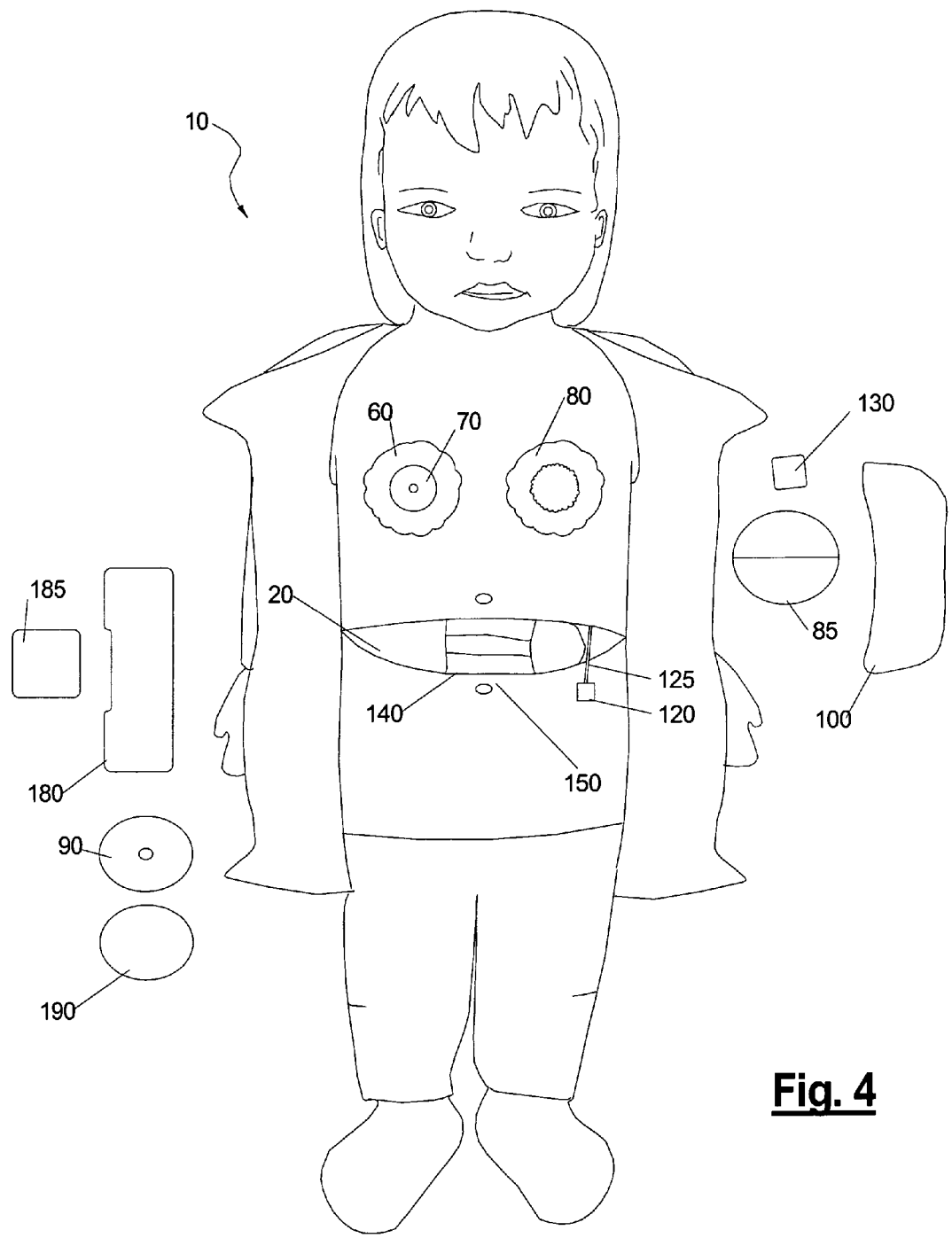
FIG. 4 is a frontal view of a doll in accordance with the present invention; the doll shown partially unclothed and with an incision in its abdomen.

FIG. 3 shows the doll 10 with the abdominal skin 100 removed, and the opening 110 exposed. Visible through the opening 110 is the abdominal muscle layer 160. A flap of material 170 is attached to the abdominal muscle layer 160 underneath the skin layer 25 with VELCRO™ and represents abdominal muscle that has been cut and pulled away from the abdominal muscle layer 160. The flap of material 160 also has VELCRO™ mounted on its free end 195. Also shown in FIG. 3 is a section of fat 185, which attaches to excess fat 180 with VELCRO™. Fat 185 and excess fat 180 fit together inside the doll's abdomen 20, below the opening 110, and between the skin layer 25 and the abdominal muscle layer 160. Finally, FIG. 3 depicts replacement skin 190 which is formed from fabric and has VELCRO™ as a backing.

Figure 5:
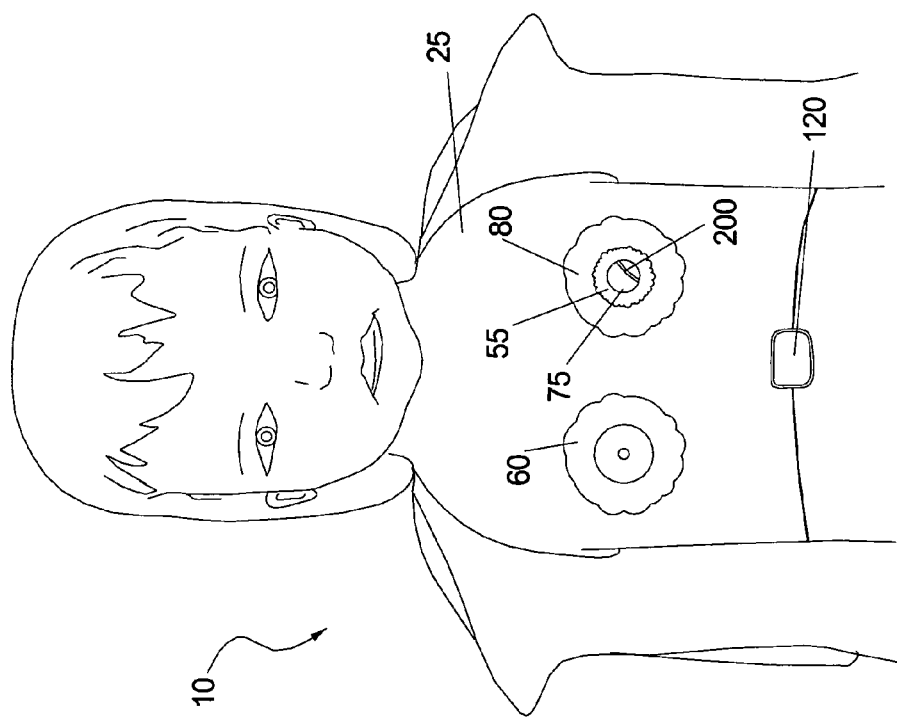
FIG. 5 is a frontal close-up of a doll in accordance with the present invention; the doll shown partially unclothed and with one of its nipples removed.

FIG. 5 shows a close up of the doll 10. The detachable nipple piece 90 is removed from the diseased breast 80, and the removable stuffing 85 (FIG. 3) has been removed. The diseased breast 80 is empty, exposing a piece of cord 200 sewn to its inside, to represent human glands.

To demonstrate the free tram flap procedure, the detachable nipple piece 90 is first removed from the diseased breast 80. The removable stuffing 85 is then removed from the diseased breast 80, representing the removal of the diseased human fat and the ducts, veins, arteries, lymph nodes, and ducts contained therein. Next, the removable abdominal skin 100 is removed from the doll 10, and the belly button piece 120 is detached from the removable abdominal skin 100. Skin flap 130 is then removed from the doll 10, and the belly button piece 120 is placed through the belly button transplant hole 150 and attached thereto. This represents the relocation of the belly button after removing the patient's excess skin.

Next, the fat 185 and excess fat 180, which are attached to one another with VELCRO™, are removed from the opening 110 in the doll's abdomen 20. The flap of material 170 is pulled away from the abdominal muscle layer 160, and is pulled through the opening 110. This represents the step of cutting a layer of abdominal muscle down both sides vertically (from below the breast to the fatty tissue) and pulling it away from the abdomen. The excess fat 180 is then separated from the fat 185 via its VELCRO™ connection, and the excess fat 180 is attached to the free end 195 of the flap of material 170.

With the excess fat 180 attached to the free end 195 of the flap 170, they are both slid toward the doll's head 40, between the skin layer 25 and the abdominal muscle layer 160, and through the opening 75 in the diseased breast 80. This represents the reconstruction of the diseased breast 80. Finally, the replacement skin 190 is attached to the diseased breast 80, and the opening 110 in the doll's abdomen 20 is closed using snaps or hooks. This represents closing up the patient. The plastic tubing 140 represents the Jackson-Pratt™ tubing which is implanted in the patient for drainage.

The same basic procedure as above is also used to demonstrate the pedicle tram operation, however the procedure is divided into two stages. The first stage involves creating the opening 110, removing the flap of material 170 completely from the doll, and closing the opening 110 with hooks or snaps. This represents the removal of abdominal muscle and tissue from the patient. The demonstration continues by again opening the opening 110 and following the procedure as outlined above for the free tram flap operation.

What is claimed is:

1. A anatomical doll for demonstrating a mastectomy procedure, said doll comprising:
    a stuffed body having an abdomen, said abdomen having a cavity therein, and said cavity capable of being fastened shut;
    a simulated healthy breast attached to said abdomen, said healthy breast made from material formed around a ball of stuffing;
    a simulated diseased breast attached to said abdomen, said diseased breast having a detachable fabric nipple and said diseased breast being filled with removable stuffing;
    a passage located between said diseased breast and said cavity, said passage located at the attachment of said abdomen and said diseased breast; and
    at lease one pillow of material removably located inside said cavity and representing human abdominal muscle.

2. The anatomical doll of claim 1, wherein said abdomen further comprises:
    a first layer of material formed around stuffing material in a pillow-like configuration, said first layer representing abdominal muscle;
    a second layer of material formed over said first layer, said second layer representing human skin; and
    a cutout in said second layer creating said cavity in said abdomen.

3. The anatomical doll of claim 2, further comprising:
    a piece of fabric representing skin, said piece of fabric removably fastened to said cut-out in said second layer;
    a simulated belly button piece removably fastened to said fabric and attached to said cavity with a simulated human umbilicus.

4. The anatomical doll of claim 1, wherein said removable stuffing consists of polyfill material having pieces of colored cord tangled therein.

5. The anatomical doll of claim 1, wherein said simulated healthy breast has a simulated nipple sewn thereto.

6. The anatomical doll of claim 1, further comprising three sections of plastic tubing, each piece of tubing protruding from inside said cavity to the outside of said abdomen.

7. The anatomical doll of claim 1, wherein said doll is a rag-doll.

8. A method of demonstrating a mastectomy comprising:
    providing an anatomical rag-doll having a simulated diseased breast;
    removing a detachable nipple piece from said diseased breast and exposing an opening atop said diseased breast;
    extracting stuffing material from said diseased breast through said opening;
    creating a cavity in an abdominal section of the rag-doll;
    removing a pillow of material simulating human fat from said cavity and placing said material in said diseased breast;
    fastening a piece of simulated skin over said opening atop said diseased breast; and
    closing said cavity in said abdominal section of the rag-doll.

9. The method of claim 8, further comprising the steps of:
    extending a flap of simulated abdominal muscle through said cavity;
    attaching said pillow of material simulating human fat to an end of said flap of simulated abdominal muscle;
    sliding said pillow of material through said cavity and into said diseased breast.

10. The method of claim 8, wherein creating a cavity in said abdominal section of the rag-doll further comprises:
removing a flap of simulated abdominal skin from the rag-doll to expose said cavity;
detaching an artificial belly button from said simulated abdominal skin;
making a belly button transplant hole in said abdomen; and
attaching said artificial belly button to said belly button transplant hole.

* * * * *